(12) United States Patent
Gruber et al.

(10) Patent No.: US 8,752,678 B2
(45) Date of Patent: Jun. 17, 2014

(54) DISC BRAKE, PARTICULARLY FOR A COMMERCIAL VEHICLE

(75) Inventors: Markus Gruber, Ebersberg (DE); Thomas Reno, Strongsville, OH (US)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 199 days.

(21) Appl. No.: 13/012,237

(22) Filed: Jan. 24, 2011

(65) Prior Publication Data

US 2011/0186391 A1    Aug. 4, 2011

Related U.S. Application Data

(63) Continuation of application No. PCT/EP2009/005356, filed on Jul. 23, 2009.

(30) Foreign Application Priority Data

Jul. 25, 2008 (DE) .......................... 10 2008 034 653

(51) Int. Cl.
F16D 55/226   (2006.01)

(52) U.S. Cl.
USPC ............... 188/73.31; 188/1.11 E; 188/1.11 L; 188/1.11 R; 188/1.11 W; 188/71.1; 188/71.9; 188/72.8; 188/73.1; 188/73.44; 116/208

(58) Field of Classification Search
USPC ................. 188/73.31, 1.11 L, 1.11 R, 1.11 W
IPC .................................. F16D 66/00,66/02, 65/56
See application file for complete search history.

(56) References Cited

U.S. PATENT DOCUMENTS

| | | | | |
|---|---|---|---|---|
| 2,905,277 A | * | 9/1959 | Cagle | 188/370 |
| 3,961,690 A | | 6/1976 | Schanz et al. | |
| 4,356,897 A | * | 11/1982 | Urban | 188/1.11 W |
| 4,391,355 A | * | 7/1983 | Evans | 188/73.44 |
| 4,658,936 A | * | 4/1987 | Moseley | 188/1.11 R |

(Continued)

FOREIGN PATENT DOCUMENTS

| | | |
|---|---|---|
| DE | 36 12 166 C2 | 10/1987 |
| DE | 3914399 A1 * | 10/1990 ............. F16D 66/02 |
| DE | 102 01 901 A1 | 8/2003 |

OTHER PUBLICATIONS

German Office Action dated Mar. 27, 2009 including English-language translation (Six (6) pages).

(Continued)

Primary Examiner — Robert A Siconolfi
Assistant Examiner — San Aung
(74) Attorney, Agent, or Firm — Crowell & Moring LLP

(57) ABSTRACT

A disc brake is arrangeable in a space that accommodates a brake caliper having an application device. The brake caliper is held slidably with guiding elements on a brake carrier, which is fastened with screws to an axle connection at the vehicle. The caliper straddles a brake disc, against which brake pads can be pressed on either side while braking. At least the brake pad on the application side is mounted movably in the direction of the brake disc in a pad shaft of the brake carrier. A device for the visual identification of the wear of a brake pad and/or brake disc is constructed so that for identifying wear, a pointer element, extending in the opposite direction to the brake disc, is connected at least at one screw.

14 Claims, 5 Drawing Sheets

(56) References Cited

U.S. PATENT DOCUMENTS

| | | | |
|---|---|---|---|
| 4,850,454 A | | 7/1989 | Korody |
| 5,228,541 A | * | 7/1993 | Plude ..................... 188/1.11 W |
| 6,076,639 A | * | 6/2000 | Dahlen et al. ............ 188/1.11 R |
| 6,213,254 B1 | | 4/2001 | Lanou, Jr. |
| 7,284,642 B2 | | 10/2007 | Macke et al. |
| 2005/0121265 A1 | * | 6/2005 | Deckhut et al. .............. 188/72.9 |
| 2005/0252727 A1 | * | 11/2005 | England et al. .......... 188/1.11 L |
| 2007/0012525 A1 | | 1/2007 | Nechvatal |

OTHER PUBLICATIONS

International Search Report dated Sep. 25, 2009 including English-language translation (Six (6) pages).

* cited by examiner

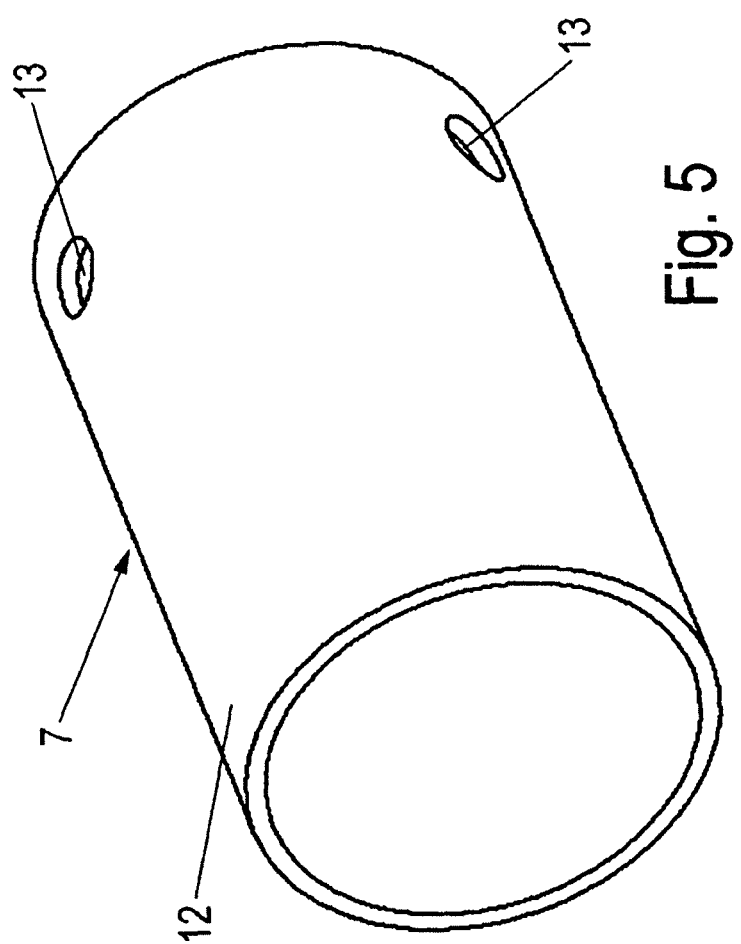

DISC BRAKE, PARTICULARLY FOR A COMMERCIAL VEHICLE

CROSS-REFERENCE TO RELATED APPLICATIONS

This application is a continuation of PCT International Application No. PCT/EP2009/005356, filed Jul. 23, 2009, which claims priority under 35 U.S.C. §119 from German Patent Application No. DE 10 2008 034 653.5, filed Jul. 25, 2008, the entire disclosures of which are herein expressly incorporated by reference.

BACKGROUND AND SUMMARY OF THE INVENTION

The invention relates to a disc brake, particularly for a commercial vehicle, having a brake caliper in which is accommodated an application device. The brake caliper is held slidably by way of guiding members on a carrier, which is fixed with screws to an axle connection on the vehicle side.

Especially for reasons relating to the operational reliability of a disc brake and ultimately also of the vehicle in which the disc brake is installed, it is necessary to monitor the wear of the brake pads to ensure that necessary replacement of the respective brake pad takes place at the best possible time. In this case, the state of wear of the brake pads, i.e. the abrasion of the respective brake pad, which is connected to a pad carrier plate, should be determined as accurately as possible beforehand.

Particularly from an economic point of view, there is a requirement for optimum timing of the exchange of the brake pads. The aim here is to perform an exchange only when the friction pad has worn down to a permitted minimum thickness. Earlier exchange would conflict with optimizing the application-related operating costs, while exchanging the pad too late would entail impairment of the functional reliability of the disc brake overall.

Various measures are known for detecting the state of wear of the brake pads. For example, the wear of the friction pad can be determined electronically, with a current-carrying cable being passed through the pad carrier plate. The cable is severed when the friction pad wears and emits a detectable signal to a signal transmitter located, for example, in the driver's cab of the motor vehicle.

Apart from this, there are known wear indicators which use a rotary potentiometer to determine a distance moved by an adjusting device during adjustment of the brake pads to compensate for wear travel, and it is likewise possible for this distance to be recognized by the driver of the vehicle, for example, by means of an appropriate indication device.

For visual recognition of the state of wear of the brake pads and/or of the brake disc, DE 36 12 166 C2 discloses the practice of providing the brake support with a marking which, in combination with a correspondingly modified pad carrier plate, is used for wear detection.

Here, the markings on the brake support are produced by appropriate forming, in particular by means of U- or V-shaped recesses in the form of notches.

By their very nature, such recesses, and indeed other necessary formations, have an effect on the strength of the brake support, and notches, in particular, lead to a reduction in fatigue resistance.

Common to all the devices for wear detection is the fact that they can only be seen essentially with the vehicle wheel removed, and this conflicts with optimized use of the device.

It is the underlying object of the invention to develop a disc brake such that it allows simpler visual wear detection with a low outlay in terms of construction.

This and other objects are achieved by a disc brake having a brake caliper in which is accommodated an application device. The brake caliper is held slidably by way of guiding members on a carrier, which is fixed with screws to an axle connection on the vehicle side. The disc brake includes a brake disc, against which brake pads can be pressed from both sides during a braking operation. At least the brake pad on the application side is mounted in a pad well of the carrier in such a way that it can be made to slide in the direction of the brake disc. A device for the visual wear detection of the brake pad and/or brake disc wear is characterized in that, for detecting wear, a pointer element extending in an opposite direction to the brake disc is connected to at least one screw.

An advantage of the invention is that wear detection is now possible without modifying the carrier (brake support) or any other components of the disc brake. In this arrangement, the pointer element, which, according to the invention, extends in the opposite direction to the brake disc, is designed as a separate part and is fixed to the brake support.

This is preferably accomplished at fixing screws, by which the brake carrier is connected to the axle connection on the vehicle side. The term fixing screws is intended to encompass any connector whether a screw, bolt, or the like.

The pointer element can be fixed on one or more of the screws by a frictional and/or positive engagement and, in the first case, the pointer element has a press-fit sleeve, which is pressed onto a screw head of the screws.

The pointer element corresponds visibly to a guide sleeve held in the brake caliper, which moves together with the brake caliper relative to the pointer element, depending on the degree of wear of the brake pad and/or brake disc.

The change which this involves in the distance between a boundary edge of the pointer element and the free end of the guide sleeve can be detected visually from the outside without having to remove the vehicle wheel. This circumstance is a significant improvement over the prior art since it is possible to carry out a wear check at virtually any time and this, of course, leads to an increase in operational reliability.

According to an advantageous aspect of in the invention, provision is made for the pointer element to be provided with at least one marking, preferably a striped marking, which allows particularly simple wear detection and is applied in a permanent manner, thus ensuring that it does not become unrecognizable, even due to the effects of weather.

Instead of being fixed to the single press-fit sleeve mentioned, it is also possible for the pointer element to be fixed to two press-fit sleeves that are mutually adjacent and are each pressed onto a screw head, thereby ensuring that the screws are secured against twisting, preventing the screws from coming loose owing to shocks due to operation.

According to another aspect, the pointer element can be formed by a pointer sleeve, which is pushed onto a screw head and is held captive there, e.g. by means of a lateral fixing screw which is screwed into the pointer sleeve and presses the latter against the screw head.

Still another aspect of the invention is that the pointer element can be produced at a particularly low price and, in principle, can be used universally. In particular, retrofitting to an already installed disc brake is possible without problems, and the pointer element is designed in such a way that it can be connected to either one or the other side of the fixing of the brake support to the axle connection.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 5 shows a detail of the disc brake according to FIG. 4 in a diagrammatic view.

DETAILED DESCRIPTION OF THE DRAWINGS

Figure 1:
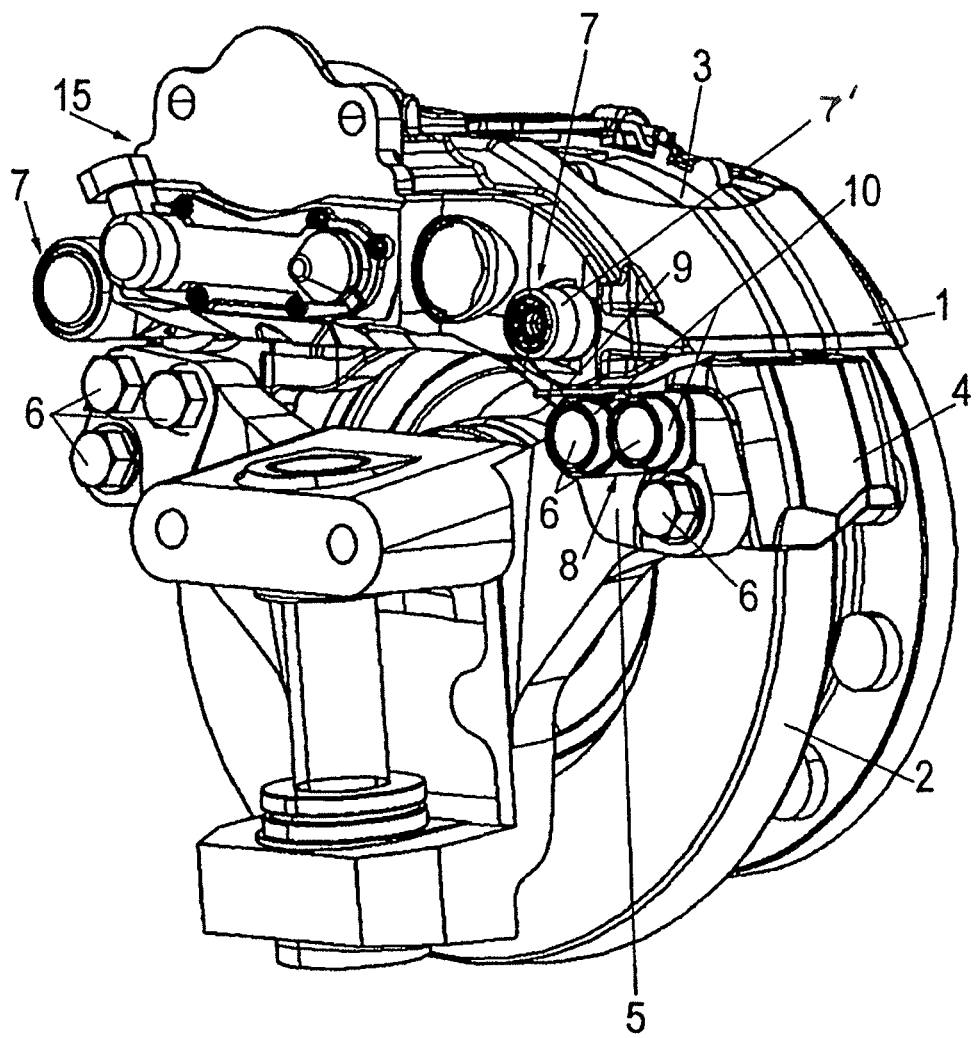
FIG. 1 is an illustrative embodiment of a disc brake according to the invention in a perspective view.
Figure 2:
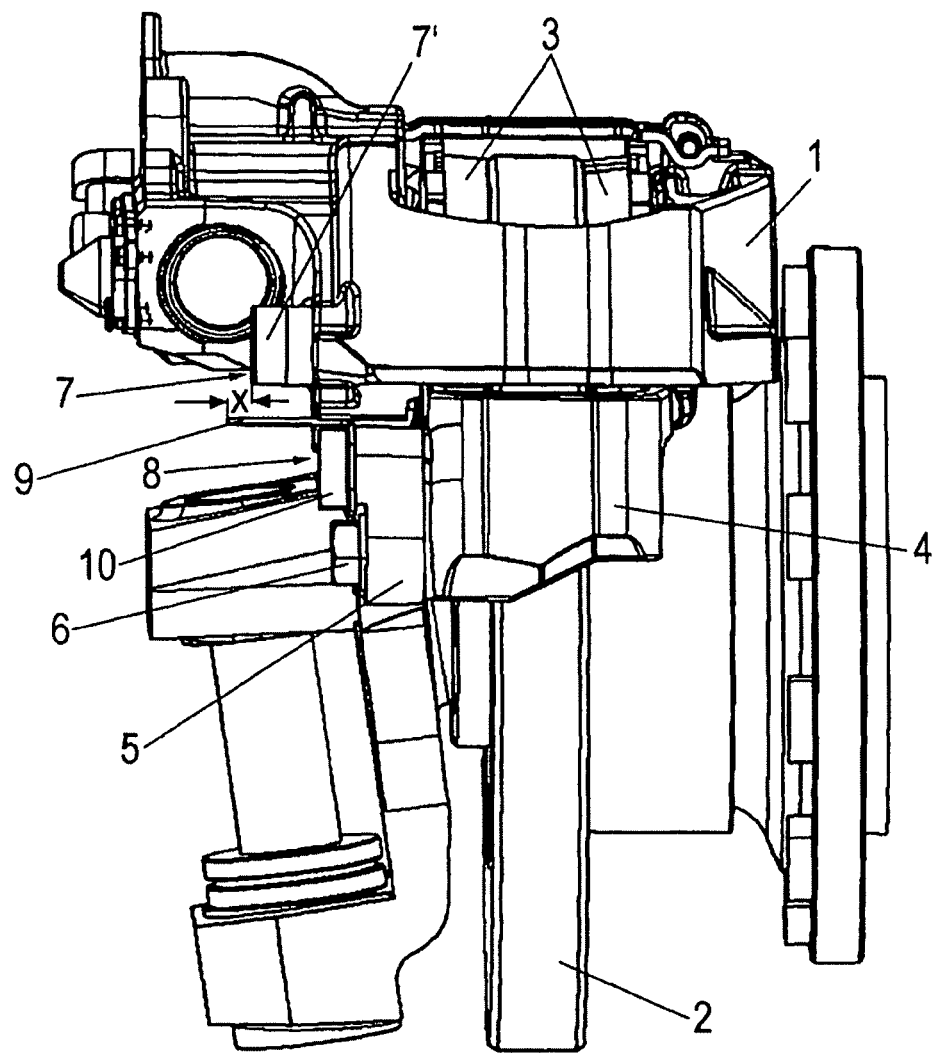
FIG. 2 shows the disc brake of FIG. 1 in a side view.
Figure 4:
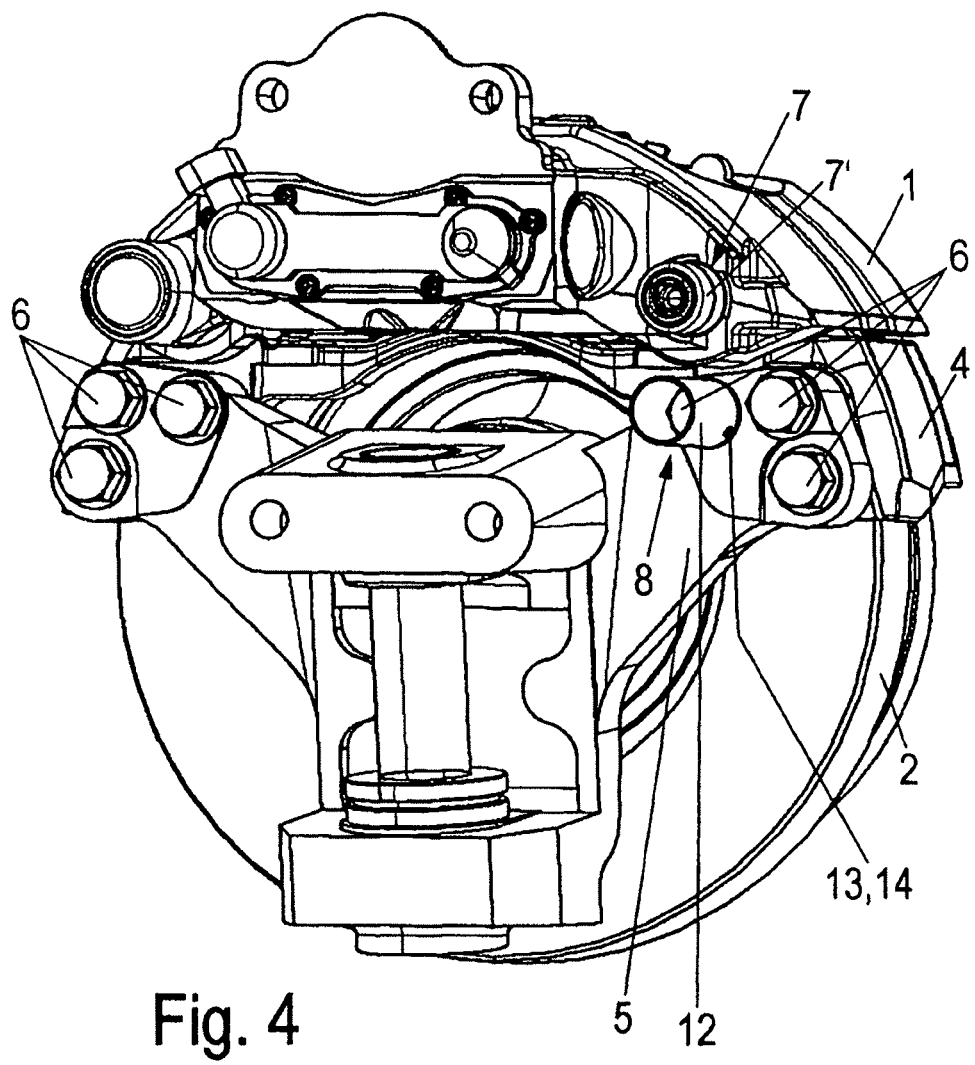
FIG. 4 shows another illustrative embodiment of a disc brake according to the invention, likewise in a perspective view.

FIGS. 1, 2 and 4 each show a disc brake for a commercial vehicle, with a brake caliper 1, which is held slidably by means of guiding elements 7 on a brake carrier 4, which is fixed with screws 6 to an axle connection 5 on the vehicle side.

The brake caliper 1 straddles a brake disc 2, against which brake pads 3 can be pressed from both sides during a braking operation. For this purpose, a brake application device 15 is provided, which can be operated pneumatically or by electric motor.

At least the brake pad 3 on the application side is mounted in a pad well of the brake carrier 4 in such a way that it can be made to slide in the direction of the brake disc 2.

The screws or bolts 6 by which the brake carrier 4 is fixed to the axle connection 5 rest with their head ends against that side of the axle connection 5 which faces away from the brake carrier 4, while being screwed into threaded holes in the brake carrier 4.

Figure 3:
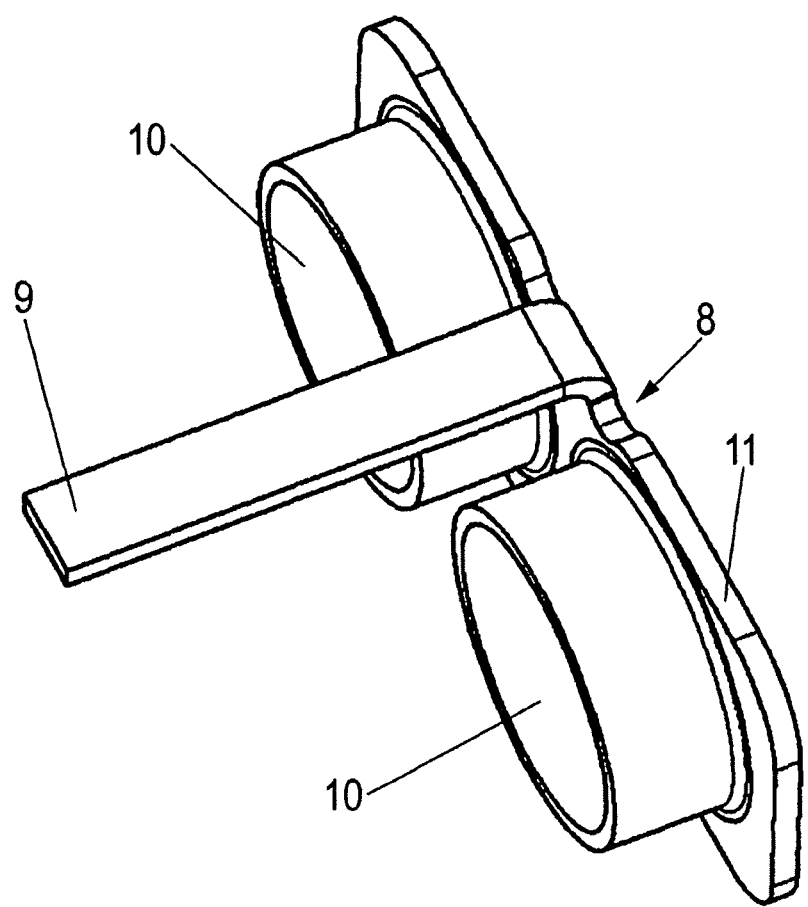
FIG. 3 shows a detail of the disc brake according to FIGS. 1 and 2 in a perspective representation.

A pointer element 8 is connected to at least one of the screws 6 and, in the illustrative embodiment according to FIGS. 1 to 3, has two press-fit sleeves 10, which are connected to one another by an integrally formed plate 11 (FIG. 3) and are pressed onto two heads of mutually adjacent screws (bolts) 6.

The plate 11 has formed on it a pointer pin 9, which extends away from the brake disc 2. In a manner corresponding with a guide sleeve 7', which is fixed in the brake caliper 1 and is part of the associated guiding element 7, the pointer pin 9, which extends parallel to the guide sleeve 7', forms a wear detector. Since the brake caliper 1 moves in the direction of extension of the pointer pin 9 as the wear of the brake pads 3 and of the brake disc 2 increases, the distance X between the free end edge of the pointer pin 9 and the end of the guide sleeve 7' decreases, and this is then a recognizable measure of the wear which has occurred.

The pointer element 8, i.e. the plate 11, the press-fit sleeves 10 and the pointer pin 9 can be formed in one piece from metal or from a suitable plastic.

In the example shown in FIGS. 4 and 5, the pointer element 8 is a pointer sleeve 12, which is pushed onto one of the screw heads 6 and is held on the head of the screw 6 in a manner secured against sliding and twisting by way of a clamping screw 14, which is screwed into a lateral threaded hole 13.

Table of Reference Numerals

| | |
|---|---|
| 1 | brake caliper |
| 2 | brake disc |
| 3 | brake pad |
| 4 | brake support |
| 5 | axle connection |
| 6 | screw |
| 7 | guiding element |
| 7' | guide sleeve |
| 8 | pointer element |
| 9 | pointer pin |
| 10 | press-fit sleeve |
| 11 | plate |
| 12 | pointer sleeve |
| 13 | threaded hole |
| 14 | clamping screw |
| 15 | application device |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc, the disc brake comprising:
   a brake carrier operatively configured to be securable to a vehicle;
   at least one screw configured to secure the brake carrier to the vehicle in a manner fixing the brake carrier against movement in an axial direction parallel to a rotation axis of the brake disc;
   a sliding caliper arranged on the brake carrier, the caliper sliding via guide members relative to the brake carrier; and
   a visual wear detector separate from the at least one screw and held on the brake carrier by the at least one screw for visually detecting wear of at least one of a brake pad of the disc brake and the brake disc, the visual wear detector comprising a pointer extending in a direction away from the brake disc.

2. The disc brake according to claim 1, wherein the pointer is secured to a head of the at least one screw.

3. The disc brake according to claim 1, wherein the pointer is operatively configured to be secured to the head of the at least one screw by a positive or frictional engagement on the head of the at least one screw.

4. The disc brake according to claim 3, wherein the pointer comprises at least one press-fit sleeve, the press-fit sleeve being pressed onto the head of the at least one screw.

5. The disc brake according to claim 1, wherein the pointer comprises:
   a plate;
   two press-fit sleeves secured to the plate; and
   wherein the at least one screw includes two mutually adjacent screws and the two press-fit sleeves are configured to be pressed onto heads of the two mutually adjacent screws.

6. The disc brake according to claim 5, further comprising a pointer pin formed on one of the two press-fit sleeves or the plate, the pointer pin extending in a direction counter to an application direction of an application side brake pad.

7. The disc brake according to claim 1, wherein the pointer comprises a pointer sleeve, the pointer sleeve being pressed onto a head of the at least one screw.

8. The disc brake according to claim 7, further comprising a clamping screw for securing the pointer sleeve on the head of the at least one screw against axial or rotational movement.

9. The disc brake according to claim 1, wherein the pointer includes markings for visually indicating wear.

10. The disc brake according to claim 9, wherein the markings are marking stripes.

11. The disc brake according to claim 6, wherein the pointer pin comprises markings for visually indicating wear.

12. The disc brake according to claim 7, wherein the pointer sleeve comprises markings for visually indicating wear.

13. The disc brake according to claim 1, wherein the pointer comprises one of a pointer pin and pointer sleeve, said pointer pin or pointer sleeve extending parallel to a guide sleeve, the guide sleeve being secured to the caliper and associated with a guide member.

14. The disc brake according to claim 1, wherein the brake carrier comprises a pad well in which at least an application-side brake pad is held while allowing for sliding movement in a direction of the brake disc.

* * * * *